UNITED STATES PATENT OFFICE 2,119,802

BASICALLY SUBSTITUTED ENOL AND THIENOL ETHERS AND ESTERS

Kurt Westphal and Heinrich Klös, Wuppertal-Elberfeld, Germany, assignors to Winthrop Chemical Company Inc., New York, N. Y., a corporation of New York No Drawing. Application December 18, 1934, Serial No. 758,111. In Germany December 20, 1933

18 Claims. (Cl. 260—127)

This invention relates to the manufacture of basically substituted enol and thienol ethers and esters.

Enol ethers and enol esters have been prepared by the action of hydroxyl compounds, such as alcohols, phenols and acids upon acetylene compounds. It is known that the said reactions succeed particularly well when the acetylene compound is substituted by unsaturated or acid groups.

In accordance with the present invention enol and thienol ethers and esters, that is compounds which contain the enol ether or ester group

(X being O or S, and R being a hydrocarbon or acyl radical) are also obtainable from acetylene compounds which contain a basic substituent, such as aminoalkyl and ammoniumalkyl groups, by reacting upon the basically substituted acetylene compounds with hydroxyl compounds, such as alcohols, phenols or acids or with the corresponding thio compounds in the presence of a condensing agent which preferably has alkaline reaction.

The formation of a basically substituted enol ether from a basically substituted acetylene compound and an alcohol, for instance, proceeds in accordance with the following equation:

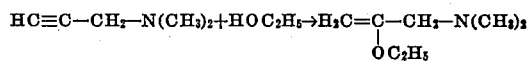

A basically substituted enol ester is formed in accordance with the following equation:

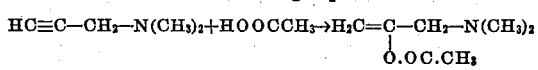

The formation of the basically substituted thienol ethers and esters performs in an anologous manner when using instead of the hydroxyl compounds the corresponding sulfhydryl compounds, that is mercaptanes, thiophenols and thiocarboxylic acids. The reaction is advantageously performed in the presence of an excess of the hydroxyl or sulfhydryl compound which is to be added to the acetylene compound thus using the hydroxyl or sulfhydryl compound as a solvent. As condensing agent preferably the alkali metal compounds of the said hydroxyl and sulfhydryl compounds are used, but also sodium and potassium hydroxide have proved operative as condensing agents. The basic substituent may be present in the acetylene compound in the form of an amino or substituted amino or quaternary ammonium group. The nitrogen atom of the said amino group may be simultaneously a member of a heterocyclic ring system as for instance in the piperidine or the quaternary piperidinium radical. The reaction is advantageously performed with heating and the reaction product isolated in the form of the salts of the enol or thienol ether or ester bases with acids, preferably the hydrohalic acids. But also sulfuric, nitric, phosphoric acid and organic acids, such as acetic, lactic, citric, tartaric, benzoic and naphthoic acid may be used for this purpose. From the salts the free bases may be obtained in the usual manner, from a hydrohalic acid salt, for instance, by treatment with silver oxide.

In further developing the present invention it has been found that the basically substituted enol ethers or esters or the corresponding thio compounds are also obtainable when reacting basically substituted aliphatic or alicyclic dihalogen compounds which are known to be useful for the transformation into acetylene compounds in accordance with known methods directly, with hydroxyl or sulfhydryl compounds of the kind above specified in the presence of an alkaline condensing agent. The reaction proceeds, for instance, according to the following reaction scheme:

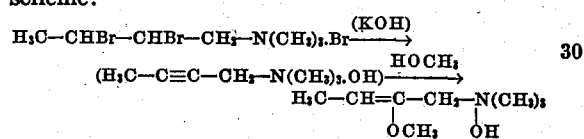

The basically substituted enol compounds may also be obtained by heating basically substituted ethers or esters containing besides the basic group a quaternary ammonium hydroxide group, for instance, a trimethylammonium hydroxide group at a carbon atom adjacent to that bearing the ether or ester group, whereby with the formation of the enol ether or ester grouping one mol. of tertiary amine and water are split off. The reaction scheme is the following:

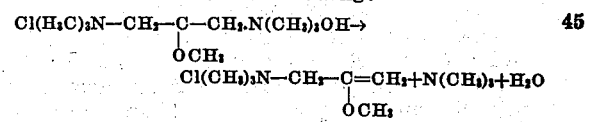

Instead of the ethers and esters also the corresponding compounds containing a free hydroxyl or sulfhydryl group may be used in the above reaction. In this case the excess quaternary ammonium compound has an alkylating effect on the hydroxyl or sulfhydryl group of the enol or thienol compound which forms intermediately in the reaction.

The new basically substituted enol ether and ester compounds are also obtainable by starting with compounds which already contain the enol ether or ester group and further contain a reactive substituent, for instance a halogen atom. By acting upon such compounds with amines the reactive substituent is replaced by an amino group. In case tertiary amines are used in the reaction, quaternary ammonium compounds are directly obtainable.

The new basically substituted enol and thienol ether and ester compounds may contain the enol or the thienol ether or ester group in open or cyclic linkage once or several times. The new compounds may further be substituted by other substituents and may contain aromatic or heterocyclic radicals. In the form of the free bases the new products are strongly basic substances, particularly the quaternary bases which take up carbon dioxide from the air with the formation of carbonates. The bases are partly oily, partly crystalline products which dissolve in organic solvents. The quaternary bases are also soluble in water but insoluble in ether. The salts of the basic enol compounds are generally white, crystalline substances which readily dissolve in water, alcohol and acetone, but are insoluble in ether.

The new compounds first of all are to be used as pharmaceutical products; particularly the quaternary compounds being composed of the lower alkyl groups, such as the methyl, ethyl, propyl and isopropyl group have proved suitable for therapeutic purposes.

The invention is further illustrated by the following examples without being restricted thereto:—

*Example 1.*—1 mol. of trimethyl-propinammoniumbromide (compare "Annalen der Chemie", 268, page 161) is dissolved in 500 ccs. of absolute methyl alcohol and added to a solution of 4 gram atoms of sodium in 500 ccs. of absolute methyl alcohol.

Instead of sodium an equivalent quantity of potassium or sodium hydroxide may be used.

The mixture is boiled under reflux for 6 hours and after that time contains the quaternary ammonium base of the formula

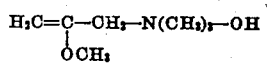

It is neutralized with hydrobromic acid. The whole solvent is removed in vacuo and the dry residue exhaustively extracted with amyl alcohol on the water bath. After distilling off the amyl alcohol the residue is recrystallized from alcohol-acetone, then from alcohol-ether. The new compound, the N-trimethyl-(2-methoxy-2,3-propenyl)-ammoniumbromide crystallizes in beautiful needles melting at 169° C. It is readily soluble in water, alcohols, difficultly soluble in cold acetone, insoluble in benzene, ether and petroleum ether. It is readily decomposed by acids, but is stable in neutral and alkaline solutions.

When using for the neutralization instead of hydrobromic acid other acids, for instance, hydrochloric, sulfuric, acetic, citric, tartaric or benzoic acids, the quaternary ammonium salts of the said acids are obtained. The sulfate is a white, crystalline product, the acetate forms a hygroscopic crystalline mass, the p-toluene sulfonate is a crystalline powder, also the oxalate and citrate. The tartrate was obtained in the form of a hygroscopic sirup. All the said salts are readily soluble in water.

The bromide is also obtained when starting with trimethyl-(2,3-dibromoallyl)-ammoniumbromide (compare "Annalen der Chemie", 268, page 155) instead of trimethyl-propinammoniumbromide. A solution of 170 parts of trimethyl-(2,3-dibromoallyl)-ammoniumbromide in 500 ccs. of methyl alcohol is heated under reflux with a solution of 69 parts of sodium in 500 parts of absolute methyl alcohol. The reaction mixture is treated as described above.

In an analogous manner there are obtained the trimethyl-(2-ethoxypropenyl)-ammoniumbromide, forming crystals melting at 115° C., and the trimethyl-(2-butyl-oxypropenyl)-ammoniumbromide melting at 110° C.

*Example 2.*—1 mol. of trimethyl-propinammoniumbromide is heated for one hour with a solution of 2 mols of sodium in ethylene glycol monomethylether. After cooling in a freezing mixture the mixture is exactly neutralized by means of hydrobromic acid and evaporated to dryness in vacuo. The residue is taken up in alcohol and precipitated with ether in fractions. By dissolving and precipitating the main precipitate several times the N-trimethyl-2-(methoxy-ethoxy)-2,3-propenyl-ammoniumbromide of the formula:

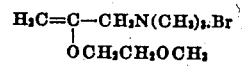

is obtained as a hygroscopic oil.

In an analogous manner the N-trimethyl-(2-dimethyl-aminoethoxy-2,3-propenyl)-ammoniumbromide is obtained when using dimethylaminoethanol as hydroxyl compound.

*Example 3.*—15 grams of trimethyl-propinammoniumbromide are heated to boiling with 38 grams of ethylmercaptane sodium and 250 grams of ethylmercaptane for 8 hours. After removing the excess mercaptane the mixture is neutralized with hydrobromic acid and evaporated to dryness in vacuo. The residue is exhaustively extracted with amyl alcohol and precipitated with ether. By reprecipitating the precipitate several times the N-trimethyl-(2-ethylthio-2,3-propenyl)-ammoniumbromide of the formula:

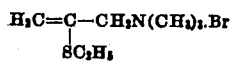

is obtained in a very hygroscopic form.

*Example 4.*—2 grams of trimethyl-propinammoniumbromide are heated in a closed vessel with 20 ccs. of glacial acetic acid and 0.7 gram of zinc oxide for 10 hours to 180° C. After cooling the dark brown content of the vessel is treated with ether until no further precipitate is obtained. The separating precipitate is taken up in water and treated with hydrogen sulfide in order to remove the zinc. The filtrate of the precipitate is evaporated to dryness and the residue recrystallized from alcohol several times. The N-trimethyl-(2-acetoxy-2,3-propenyl)-ammoniumbromide is thus obtained in white tablets melting at about 141° C.

In the same manner the N-trimethyl-(2-propionyloxy-2,3-propenyl)-ammoniumbromide of the formula:

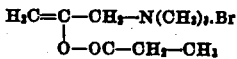

is obtained in very hygroscopic needles when using propionic acid.

When using diethylacetic acid the N-trimethyl-(2-diethylacetoxy-2,3-propenyl)-ammoniumbromide is obtained as a hygroscopic sirup.

*Example 5.*—45 parts by weight of 2-methoxy-3-chloropropene-1,2 are heated in a closed vessel with 200 parts by weight of a 28% solution of dimethylamine in benzene for 10 hours to 125° C. The dimethylamino-hydrochloride which has separated is filtered with suction and the main quantity of benzene is evaporated from the filtrate. Subsequently the 3-dimethylamino-2-methoxypropene-1,2 of the formula:

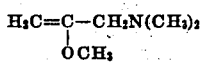

distils mixed with the starting material and the solvent. Without separation of the said components 50 parts by weight of methylbromide are added and the mixture is kept in a closed vessel for 8 hours at 40° C. Thereafter an abundant crystallization of the quaternary salt has taken place. After recrystallization from alcohol-acetone the same N-trimethyl-(2-methoxy-2,3-propenyl)-ammoniumbromide melting at 169° C. is obtained as described in Example 1.

When shaking the N-trimethyl-(2-methoxy-2,3-propenyl)-ammoniumbromide in aqueous solution with silver oxide, silver bromide is formed. The latter is separated and the solution evaporated to dryness. The ammonium base is thus obtained in very hygroscopic form as crystallizing cake. This substance eagerly absorbs carbonic acid from the air and transforms into the carbonate which was obtained in pure crystalline form as water-soluble substance.

From the ammonium base by neutralization with hydriodic acid the beautifully crystallizing, water-soluble N-trimethyl-(2-methoxy-2,3-propenyl)-ammoniumiodide was obtained.

The enol ether used as starting material is obtained in the following manner:

20 grams of monochloroacetone-dimethylacetal, boiling at 132–134° C., obtained from formimino-methyl-ether, methanol and chloroacetone, are heated with 0.6 gram of quinoline phosphate at a long ascending tube with descending cooler. At bath temperatures slowly rising from 200 to 270° C. first the methyl alcohol, then the 2-methoxy-3-chloropropene-1.2 are distilled off. The temperature at the end of the ascending tube shall not exceed 113° C. The reaction requires about 3 hours. The distillate is shaken out after the addition of ether with sodium bicarbonate and water in order to remove traces of acid and alcohol. After drying the ethereal extract by means of sodium sulfate, the 2-methoxy-3-chloropropene-1,2 boils at 110–112° C.

The corresponding ethoxy compound is obtained when heating 6 grams of 2-ethoxy-3-chloro-propene-1.2 with 4 grams of trimethylamine and 4 grams of alcohol for 8 hours to 100° C. and precipitating a brown oil by means of ether from the reaction mixture and boiling this oil, after repeated dissolution in alcohol and precipitation with ether, with water and animal charcoal for a longer period of time. The aqueous solution, after evaporation in vacuo, yields beautiful colorless, very hygroscopic crystals of the N-trimethyl-(2-ethoxy-2.3-propenyl)-ammoniumchloride.

The 2-ethoxy-3-chloropropene-1.2 used as starting material is obtained when heating 25 grams of mono-chloroacetone-diethylacetal (compare "Berichte der Deutschen Chem. Gesellschaft", 40, page 3304) in accordance with the directions indicated above (paragraph 3 of this example) during 2 to 3 hours to 200 to 270° C. whereby the temperature at the end of the ascending tube shall not exceed 125° C. The 2-ethoxy-3-chloropropene-1.2 boils at 130–132° C.

In an analogous manner an enol ether of the cyclohexene is obtained as follows:

4.5 grams of 2-ethoxy-2,3-cyclohexenylchloride are heated with 3.3 grams of trimethylamine and 5 grams of alcohol for 15 hours to 100° C. Upon the addition of ether an oil is precipitated which becomes crystalline on triturating with acetone. After repeated recrystallization from methanol-acetone the N-trimethyl-(2-ethoxy-2,3-cyclohexenyl)-ammoniumchloride melting at 97° C. is obtained. It has the formula:

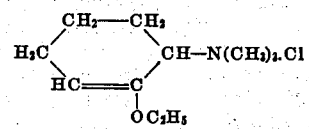

The starting material is obtained by heating 20 grams of chlorocyclohexanon-diethylacetal, boiling at 100–104° C. under 16 mm. pressure, obtainable by reacting ortho-formic acid ester upon chlorocyclohexanon with 0.6 gram of quinoline phosphate at a short ascending tube and under 200 to 90 mm. pressure (gradually falling). The temperature of the bath is kept at 170–190° C. The distillate is collected in a sodium bicarbonate solution and treated in the customary manner. Thus the 2-ethoxy-2,3-cyclohexenylchloride boiling at 92–96° C. under 15 mm. pressure is obtained.

A piperidinium compound is obtained when heating 18 grams of the above specified 2-ethoxy-3-chloropropene-1,2 with 15 grams of N-methyl-piperidine and 9 ccs. of dry benzene for 12 hours to 100° C. Thereby crystals are precipitated. These crystals, after washing with benzene, are recrystallized from acetone with the addition of animal charcoal. Thus the very hygroscopic crystals of the N-methyl-(2-ethoxy-propenyl)-piperidiniumchloride are obtained. It has the formula:

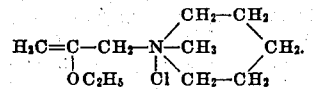

In an analogous manner the N-trimethyl-(2-ethoxy-1,2-pentenyl)-ammoniumbromide is obtained from 2-ethoxy-1,2-pentenyl-5-bromide and trimethylamine. It forms hygroscopic crystals melting at 136° C.

*Example 6.*—3.7 grams of 2-methoxy-3-chloropropene-1,2 are boiled with 2 grams of tetramethyl-ethylenediamine and 3 ccs. of benzene for 5 hours. Then the benzene is poured off from the mixture, the remaining dark sirup dissolved in water and purified by means of animal charcoal and evaporated to dryness in vacuo. A colorless, very hygroscopic oil, the N.N'-tetramethyl-N.N'-di-(2-methoxy-2,3-propenyl)-ethylenediammoniumdichloride, precipitates from alcohol upon the addition of ether. It has the formula:

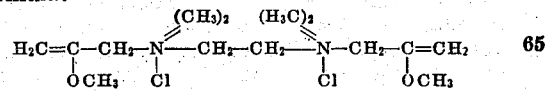

*Example 7.*—A suspension of 83 parts by weight of 1,3-tetramethyldiamino-2-propanol-dichloromethylate in a solution of 20 parts by weight of caustic potash (95%) in 100 parts by weight of 50% alcohol is heated for 10 hours to 100–110° C. under strongly reduced pressure. Simultaneously with the splitting off of trimethylamine a splitting off of water and intramolecular etherification of the so far free hydroxyl groups takes place in accordance with the following reaction scheme:

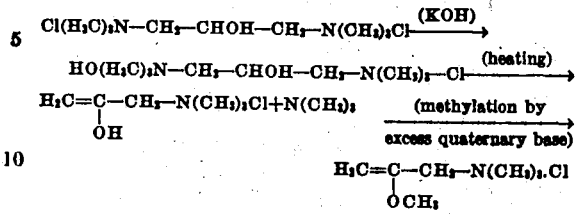

After the mixture has completely evaporated to dryness in vacuo the crystalline residue is exhaustively extracted with amyl alcohol and that part which is soluble in amyl alcohol is extracted with acetone after evaporation of the amyl alcohol. The residue of the acetone solution is taken up in water. Upon the addition of picrolonic acid a yellow salt of the acid with the N-trimethyl-(2 - methoxy - 2,3 - propenyl) - ammonium base formed, melting at 162° C., crystallizes.

The same product is obtained when taking instead of the 1,3-tetramethyldiamino-2-propanol-dichloromethylate the corresponding quantity of 1,3-tetramethyldiamino-2-methoxy-propane-dichloromethylate.

Example 8.—14 grams of the carbonate of the beta-hydroxypropyl-alpha-gamma-hexamethyl-diammoniumchloride in 40 ccs. of absolute methyl alcohol are treated with alcoholic caustic potash solution (corresponding to 3 grams of potassium hydroxide). The potassium chloride precipitating is filtered with suction and the filtrate is evaporated to dryness in vacuo. The remaining sirup is heated in vacuo at a temperature rising from 100 to 135° C. The trimethylamine formed is collected in titrated sulfuric acid and thus the course of the splitting off of trimethylamine controlled. After about 5 hours two equivalents of acid have been consumed. The residue is boiled with absolute alcohol with the addition of animal charcoal. After evaporating the solution in vacuo the carbonate of the N-trimethyl-(beta-hydroxypropenyl)-ammoniumchloride is obtained as oil.

The quaternary salt used as starting material is obtained in the known manner from 1.3-tetramethyldiamino-2-propanol, sodium and phosgen and by reacting upon the base thus formed boiling at 147–149° C. under 5 mm. pressure with methylchloride.

Example 9.—31.8 grams of dimethylurethane of the 1,3-tetramethyldiamino-2-propanol-dichloromethylate in 60 ccs. of absolute alcohol are treated with alcoholic caustic potash solution (corresponding to 5.6 grams of potassium hydroxide). After the potassium chloride precipitating has been filtered with suction the solution is concentrated to a sirup in vacuo. The sirup is heated for about 3 hours in vacuo at a temperature of 90–110° C. whereby the calculated quantity of trimethylamine is split off. The brown residue is boiled with alcohol and animal charcoal. After concentrating the solution in vacuo the dimethyl-aminourethane of the N-trimethyl-(beta-hydroxy-propenyl)-ammoniumchloride is obtained as a colorless oil.

The compound used as starting material is obtainable from dichlorohydrin by subsequent reaction of phosgen, dimethylamine and methylchloride.

Example 10.—12 grams of 2-ethoxy-3-chloro-1,2-propene are boiled with 20 grams of 6-methoxy-8-aminoquinoline and 20 grams of alcohol for 12 hours under reflux. Then the mixture to which water and alkali have been added is extracted with ether. The residue of the ethereal extract boils at 162–182° C. under 1.5 mm. pressure. The 2-ethoxy-3-(6'-methoxy-8'-quinolyl-amino)-propene-1.2 is obtained as a light yellow oil.

Example 11.—30 grams of 2-ethoxy-3-chloro-1,2-propene are heated with 50 grams of diethylamine and 150 grams of toluene in a closed vessel on the water bath. After neutralization with hydrobromic acid the toluene is removed in vacuo, the residue is taken up in a small quantity of water, salted out with potassium carbonate and repeatedly extracted with ether. On fractionating the ether residue the 2-ethoxy-3-diethylaminopropene-1.2 is obtained as a colorless liquid boiling at 63–66° C. under 35 mm. pressure.

Example 12.—17.8 grams of trimethylpropinammonium bromide are heated to boiling for 20 minutes with 100 ccs. of normal caustic soda solution and 11.6 grams of phenol sodium. After cooling to 0° C. the mixture is exactly neutralized with hydrobromic acid and the unchanged phenol is removed by extraction with ether. The aqueous solution is evaporated to dryness and the residue exhaustively extracted with absolute alcohol. The clear alcoholic solution is precipitated with ether and the precipitate recrystallized from alcohol several times. The needles of the N-trimethyl - (2-phenoxy-2,3-propenyl) - ammoniumbromide obtained become brown at about 170° C. and decompose at about 240° C. while foaming.

In the same manner the N-trimethyl-(2-alpha-naphthoxy -2,3- propenyl)-ammoniumbromide is obtained as crystalline mass melting at 168° C. Same as in the other examples also in this example the hydrobromic acid may be replaced by other acids in the neutralization process. For instance, the N-trimethyl - (2 - phenoxy - 2,3 - propenyl)-ammoniumbenzoate was obtained as a white, water-soluble crystalline substance, and the N-trimethyl - (2-alpha-naphthoxy -2,3- propenyl) - ammoniumnitrate as a hygroscopic water-soluble, white substance.

Example 13.—50 grams of trimethyl-2,3-dibromoallyl-ammoniumbromide are introduced into a solution of 20 grams of sodium in 700 grams of allyl alcohol and heated to 80° C. for 6 hours while stirring. After cooling the mixture is neutralized with alcoholic hydrobromic acid and evaporated to dryness under reduced pressure. The dry residue is repeatedly extracted with alcohol at 70° C. and the undissolved sodium bromide is filtered off. The combined alcoholic solutions are concentrated. The residue is reprecipitated several times from alcohol with ether. The sirup obtained is the N-trimethyl-(2-allyloxy-2,3-propenyl)-ammoniumbromide.

Example 14.—35.4 grams of N-trimethyl-2,3-dibromobutyl-ammoniumbromide are dissolved in 200 ccs. of methanol and boiled on the waterbath together with a solution of 25 grams of potassium hydroxide in 200 ccs. of methanol for 2 hours under reflux. The mixture is then cooled and neutralized with alcoholic hydrobromic acid. It is separated from the potassium bromide precipitating and the alcoholic solution is fractionally precipitated with ether. Thus beautiful crystals melting at 93° C. are obtained. The product is the N-trimethyl-2-methoxy-2,3-butenyl-ammoniumbromide.

In the same manner the N-trimethyl-2-methoxy-2,3-pentenylammoniumbromide is obtained from N-trimethyl-2,3-dibromopentylammoniumbromide as beautifully crystallizing water-soluble substance and the trimethyl-2-methoxy-2,3-heptenyl-ammoniumbromide from N-trimethyl-2,3-dibromoheptylammoniumbromide which is obtained from alcohol in coarse crystals. The products described in this example are also readily obtainable in the form of salts with other acids. The propionate, gluconate and phosphate are, for instance, white, readily water-soluble, crystalline powders.

We claim:—

1. Alkyl ethers of enol compounds of the general formula:

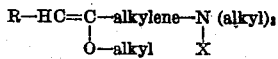

wherein R stands for a substituent selected from the group consisting of hydrogen and lower alkyl groups, alkyl stands for a lower alkyl group and X stands for an anion selected from the group consisting of the hydroxyl group and the anions of acids.

2. Alkyl ethers of enol compounds of the general formula:

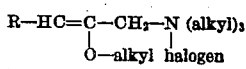

wherein R stands for a substituent selected from the group consisting of hydrogen and lower alkyl groups, and alkyl stands for an alkyl group of at most three carbon atoms.

3. Alkyl ethers of enol compounds of the formula:

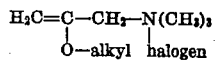

wherein alkyl stands for an alkyl group of at most three carbon atoms.

4. Alkyl ethers of enol compounds of the formula:

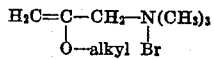

wherein alkyl stands for an alkyl group of at most three carbon atoms.

5. The enol ether compound of the formula:

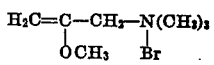

which forms crystals melting at 169° C. and is readily soluble in water and alcohols, but insoluble in benzene and ether.

6. The process which comprises reacting upon an acetylene compound of the formula:

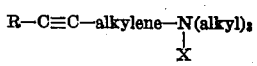

wherein R stands for a substituent selected from the group consisting of hydrogen and lower alkyl groups, alkyl stands for a lower alkyl group and X stands for an anion selected from the group consisting of the hydroxyl group and the anions of acids with a compound of the formula alkyl-X, in which alkyl stands for a lower alkyl group and X stands for one of the groups —OH and —SH, in the presence of an alkaline condensing agent.

7. The process which comprises reacting upon an acetylene compound of the formula:

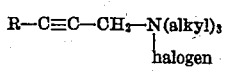

wherein R stands for a substituent selected from the group consisting of hydrogen and lower alkyl groups, and alkyl stands for an alkyl group of at most three carbon atoms, with an open chain lower aliphatic monohydric alcohol of at most three carbon atoms in the presence of an alkaline condensing agent.

8. The process which comprises reacting upon an acetylene compound of the formula:

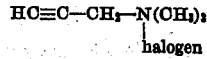

with an open chain lower aliphatic monohydric alcohol of at most three carbon atoms in the presence of an alkaline condensing agent.

9. The process which comprises reacting upon an acetylene compound of the formula:

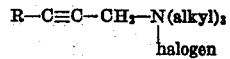

wherein R stands for a substituent selected from the group consisting of hydrogen and lower alkyl groups, and alkyl stands for an alkyl group of at most three carbon atoms, with an open chain lower aliphatic monohydric alcohol of at most three carbon atoms in the presence of an alkali metal alcoholate.

10. The process which comprises reacting upon an acetylene compound of the formula:

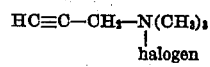

with an open chain lower aliphatic monohydric alcohol of at most three carbon atoms in the presence of an alkali metal alcoholate.

11. The process which comprises reacting upon an acetylene compound of the formula:

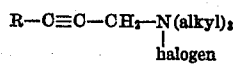

wherein R stands for a substituent selected from the group consisting of hydrogen and lower alkyl groups, and alkyl stands for an alkyl group of at most three carbon atoms, with an open chain lower aliphatic monohydric alcohol of at most three carbon atoms in the presence of an alkaline condensing agent, and finally neutralizing the reaction mixture with a hydrohalic acid.

12. The process which comprises reacting upon an acetylene compound of the formula:

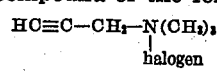

with an open chain lower aliphatic monohydric alcohol of at most three carbon atoms in the presence of an alkaline condensing agent and finally neutralizing the reaction mixture with a hydrohalic acid.

13. The process which comprises reacting upon an acetylene compound of the formula:

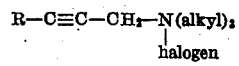

wherein R stands for a substituent selected from the group consisting of hydrogen and lower alkyl groups, and alkyl stands for an alkyl group of at most three carbon atoms, with an open chain lower aliphatic monohydric alcohol of at most three carbon atoms in the presence of an alkali metal alcoholate, and finally neutralizing the reaction mixture with a hydrohalic acid.

14. The process which comprises reacting upon an acetylene compound of the formula:

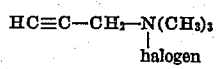

with an open chain lower aliphatic monohydric alcohol of at most three carbon atoms in the presence of an alkali metal alcoholate and finally neutralizing the reaction mixture with a hydrohalic acid.

15. The process which comprises reacting upon an acetylene compound of the formula:

$$HC{\equiv}C-CH_2N(CH_3)_2$$
$$|$$
$$Br$$

with an open chain lower aliphatic monohydric alcohol of at most three carbon atoms in the presence of an alkali metal alcoholate of the alcohol used, and finally neutralizing the reaction mixture with hydrobromic acid.

16. The enol ether compound of the formula:

$$H_2C{=}C-CH_2-N(CH_3)_2$$
$$|\qquad\qquad|$$
$$OC_2H_5\ \ Br$$

which forms crystals melting at 115° C.

17. Alkyl ethers of enol compounds of the general formula:

$$H_2C-C{=}CH-CH_2N(CH_3)_2$$
$$|\qquad\qquad|$$
$$Oalkyl\ \ Br$$

wherein alkyl stands for an alkyl group of at most 3 carbon atoms.

18. The enol ether compound of the formula:

$$H_2C-C{=}CH-CH_2N(CH_3)_2$$
$$|\qquad\qquad|$$
$$OCH_3\ \ Br$$

which forms crystals melting at 93° C.

KURT WESTPHAL.
HEINRICH KLÖS.